UNITED STATES PATENT OFFICE.

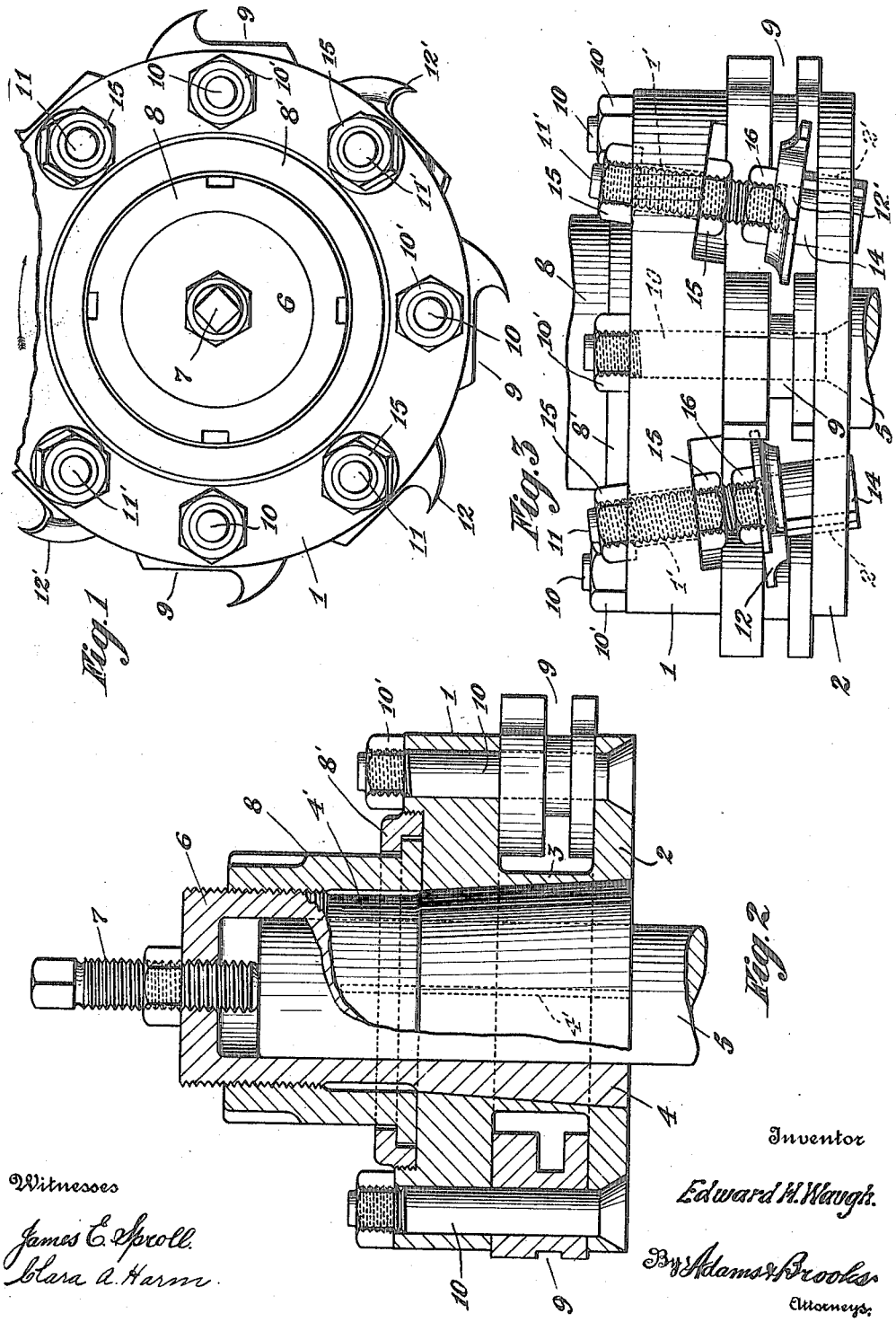

EDWARD H. WAUGH, OF SEATTLE, WASHINGTON, ASSIGNOR TO JOHN W. WINNINGHAM, OF SEATTLE, WASHINGTON.

BUSHING.

1,196,191.      Specification of Letters Patent.      Patented Aug. 29, 1916.

Original application filed March 25, 1911, Serial No. 616,967. Divided and this application filed May 19, 1913. Serial No. 768,622.

*To all whom it may concern:*

Be it known that I, EDWARD H. WAUGH, a citizen of the United States of America, and a resident of the city of Seattle, in the county of King and State of Washington, have invented certain new and useful Improvements in Bushings, of which the following is a specification, the same being a division of my application for patent for cutter-heads filed March 25, 1911, and Serial No. 616,967.

The present invention has for its primary aim to provide an improved and efficient means for connecting driving and driven elements for movement of one with the other.

For a full understanding of my invention, reference is to be had to the following description, the annexed claims and the accompanying drawing wherein like references of character refer to like parts throughout the several views.

Figure 1 is a top plan view of my invention disclosing, for the sake of illustration, a cutter head mounted on a spindle. Fig. 2 is a diametrical section thereof with the spindle clamping member in broken section, and Fig. 3 is a side elevation of the cutter head applied to the spindle.

The head proper comprises opposite annular like supports 1 and 2, shown in the form of flange extensions of a hub 3, fitting on a tapering sleeve 4 split longitudinally, as at 4', and applied to a spindle or shaft 5. This spindle extends into cap 6 which has screw threaded engagement with an adjusting screw 7 opposing the adjacent end surface of the spindle.

Screwed on cap 6, is a nut 8 having a peripheral base flange which turns freely in a rabbeted ring 8' screwed with a tight fit into an annular boss of flange 1. By this arrangement the head may be quickly secured to or released from the spindle by manipulating nut 8 on cap 6 to force hub 3 against the tapering surface of sleeve 4 or contrariwise, as the case may be.

Upon screwing nut 8 on the bushing or sleeve 4, the longitudinal sections of the latter will be sprung inwardly into clamping relation with spindle 5 and thereby firmly lock the head on the latter.

Fitting in respective apertures of the flanges 1, 2, and engaged with interposed cutters 9 which are snugly fitted to serve as sustaining spaces, are clamping members or bolts 10 whose nuts 10' are set up to spring flange 2 for a tight grip of the flanges on the cutters 9. Between the clamping members 10 are cutter-holders 11, 11 and 11', 11' which have an upward and downward inclination, respectively, in the direction of rotation of the head and carry cutters 12, 12 and 12', 12' at respective sides of a plane intermediate the cutting circles of the cutters 9, which, as shown, are in the form of double jointing cutters of the circular type. These cutter holders are conveniently in the form of bolts each having an elongated head, as 14, and fitting slidably in respectively inclined seats or apertures 1', 2' of the flanges 1, 2 with its head 14 serving as a seat for a cutter and steadied by engagement in its aperture 2' of flange 2. Each holder is provided with three clamping nuts, two of which, indicated at 15, are normally set up against respective inclined seats provided on flange 1 while the third, indicated at 16, is set up against the cutter carried by the holder.

The cutters 12, 12', which as shown, are in the form of circular bits adapted for working a tongue on the stock intermediate the cutting circles of the jointing cutters 9, can be adjusted crosswise of the space between flanges 1 and 2 by proper manipulation of nuts 15, to effect the desired movement of the supports 11, 11', during which operation heads 14 slide freely in flange 2.

Having thus described my invention, what I claim as new, and desire to secure by Letters Patent of the United States of America, is:—

1. A shaft, a body to be secured thereon, a means for securing the body upon the shaft comprising an interposed tapered and slit sleeve, one of the connected parts being complementally tapered, the sleeve having an untapered and threaded extension from the smaller end of the taper, a sleeve nut threaded upon the threaded part of the sleeve and having an outwardly projecting flange, one face of said flange having thrust engagement with a face of the outer secured body, and a flanged member removably secured to said outer secured body and engaging the outwardly facing surface of the flange of the sleeve nut.

2. In combination a shaft, a body, means for securing the body upon the shaft comprising a tapered sleeve interposed between the shaft and said body, and acting to clamp the two together by axial movement of the sleeve relative to one of the other members, said body having an axially projecting flange spaced outwardly from the sleeve and interiorly threaded, a ring exteriorly threaded to screw within said flange and having an inwardly overhanging flange, and a nut member screwing upon the sleeve and having an outwardly projecting flange fitting between said flange of the ring and the face of said body.

3. In combination, a shaft, a body, means for securing the body upon the shaft comprising a sleeve fitting upon the shaft and having one end exteriorly tapered and longitudinally slit, the body having a bore tapered to conform to the tapered part of the sleeve and an axially projecting flange concentric with and spaced outwardly from said bore, said flange being interiorly threaded, a ring nut exteriorly threaded to fit the threads of said flange and having an overhanging inwardly projecting flange, and a nut member screwing upon the projecting end of the sleeve and having a radial outwardly projecting flange fitting against the face of said body and under the overhanging flange of the ring nut.

4. In combination, a shaft, a body which it is desired to secure upon said shaft, and an interposed locking sleeve, the inner surface of the body being tapered and one end of the sleeve engaging therewith being complementally tapered and the sleeve being longitudinally slit, the sleeve having an extension from the other end which contains a threaded section, the same face of the body having an axially projecting threaded flange, a ring threading upon said flange and having an inwardly-projecting flange spaced outwardly of the face of the cutter head, and a sleeve threading upon the threaded section of the tapered sleeve and having a thrust bearing against the face of the body and against the inner face of the flange of said ring.

Signed at Seattle, Washington, this 6th day of May, 1913.

EDWARD H. WAUGH.

Witnesses:
CLARA A. HARM,
E. ARLITA ADAMS.

Copies of this patent may be obtained for five cents each, by addressing the "Commissioner of Patents, Washington, D. C."